W. N. JAY.
SEED PLANTER.
APPLICATION FILED APR. 27, 1909.
941,579.
Patented Nov. 30, 1909.
2 SHEETS—SHEET 2.
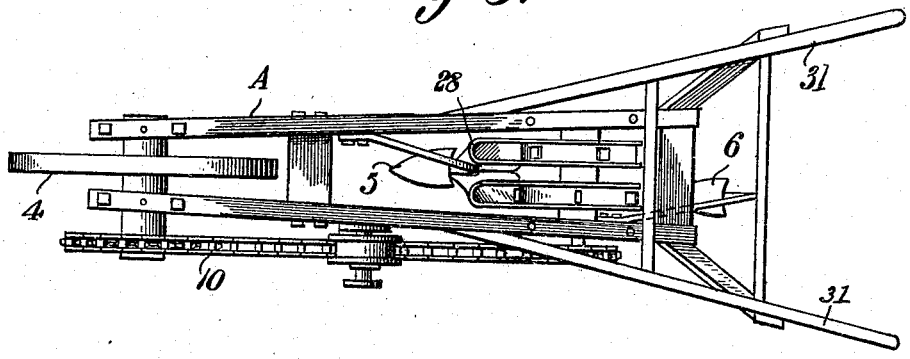
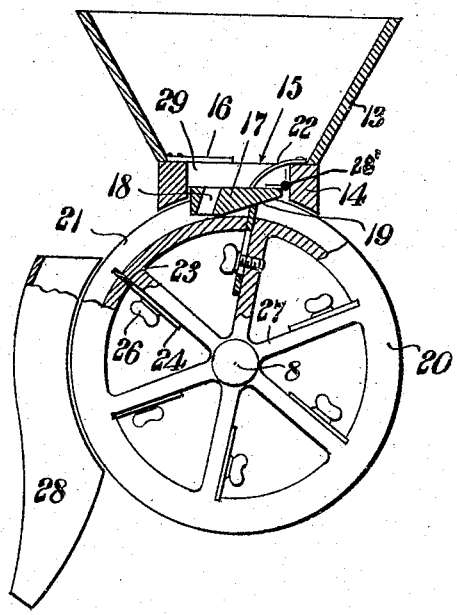
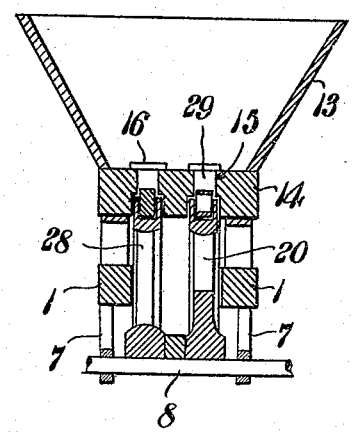
WITNESSES:
William N. Jay,
INVENTOR.
By C. A. Snow & Co.
ATTORNEYS

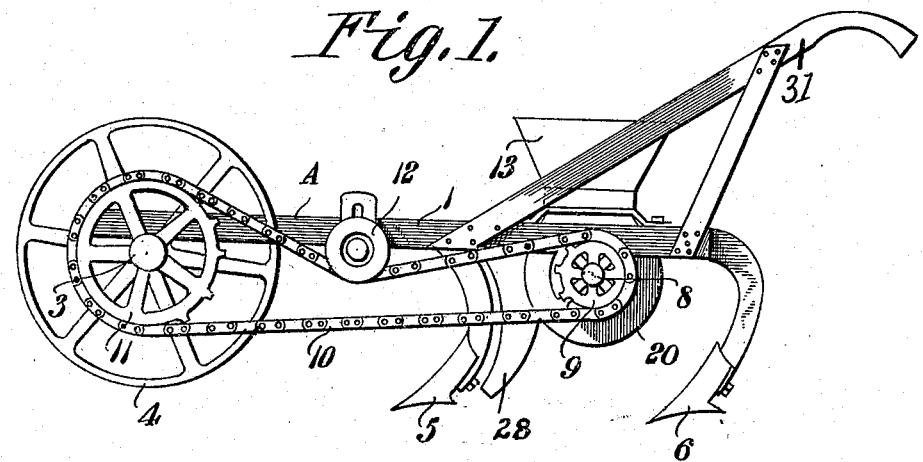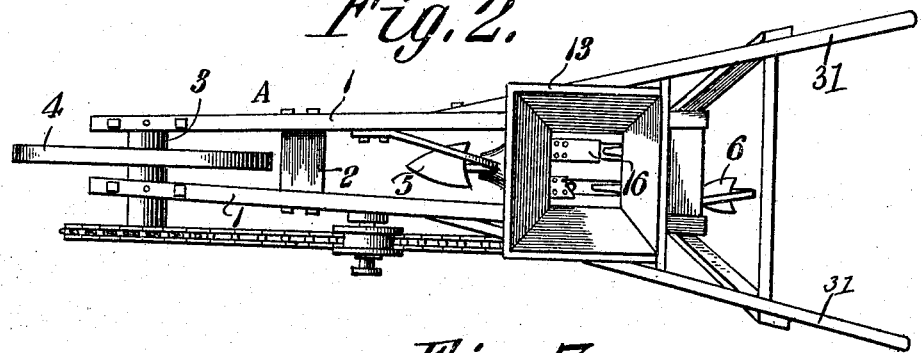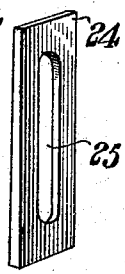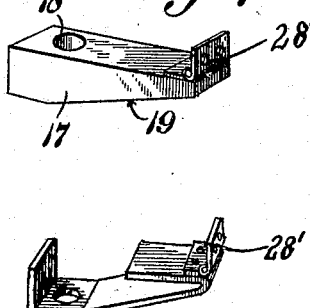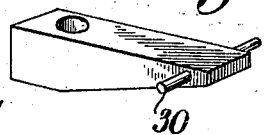

UNITED STATES PATENT OFFICE.

WILLIAM NICOLAS JAY, OF MOSCOW, IDAHO, ASSIGNOR OF ONE-HALF TO WESLEY M. HATFIELD, OF MOSCOW, IDAHO.

SEED-PLANTER.

941,579.   Specification of Letters Patent.   Patented Nov. 30, 1909.

Application filed April 27, 1909. Serial No. 492,570.

*To all whom it may concern:*

Be it known that I, WILLIAM NICOLAS JAY, a citizen of the United States, residing at Moscow, in the county of Latah and State of Idaho, have invented a new and useful Seed-Planter, of which the following is a specification.

This invention relates to seed planters and its object is to provide a simple, durable and efficient device of this character which can be readily manipulated and which is designed to plant seeds in rows or hills.

Another object is to provide simple and efficient means whereby the amount of seed dropped into each hill can be regulated.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of the planter; Fig. 2 is a plan view thereof, one of the two guard plates being partly removed; Fig. 3 is a plan view of the machine with the hopper and the valve removed; Fig. 4 is a longitudinal section through the hopper and the dropping mechanism; Fig. 5 is a transverse section through the hopper, valves, and the upper portions of the feeding wheels; Fig. 6 is a detail view of one of the tripping devices; and Figs. 7 8 and 9 are perspective views of various forms of valves or seed droppers.

Referring to the figures by characters of reference, A is the frame of the planter the same being of any preferred construction. In the drawings the same has been shown made up of side beams 1 suitably connected as shown at 2 and journaled upon the front portions of these side beams is the axle 3 of a supporting or drive wheel 4. A furrow opening plow 5 is secured to one of the beams of the frame and a covering plow 6 is preferably connected to the other beam, both plows being disposed in proper relation to each other. Journaled in suitable hangers 7 depending from the beams 1 is a shaft 8 having a sprocket 9 at one end which receives motion through a chain 10 from a drive sprocket 11 rotatable with the wheel 4.

An idler 12 is adjustably connected to one of the beams of frame A and bears upon the chain 10 so as to hold it taut.

A hopper 13 is supported by the frame A and has a neck portion 14 at the bottom thereof. When the planter is designed for discharging seeds at two points simultaneously, as shown in the drawings, the neck 14 has two openings 15 therein and disposed along parallel lines. A guard plate 16 extends over the front portion of each of these openings and hinged to the rear portion of each opening is a valve 17 having an opening 18 therethrough near its front end designed to permit the escape of seeds therethrough. This opening is disposed beneath the guard plate. That portion of the lower face of the valve between the opening and the hinged end is preferably beveled upwardly and rearwardly, as shown at 19. Coöperating with each valve 17 is a feeding wheel 20 secured to the shaft 8. Each of the feeding wheels has a peripheral groove 21 in which rides the apertured end of one of the valves 17, said end being yieldingly held within the groove by a spring 22. Openings 23 are formed within the periphery of each wheel 20 and adjustably mounted in each of these openings is a tripping plate 24 having a longitudinal slot 25 designed to receive a set screw 26 whereby the plate can be fastened in any desired position within the opening 23. These plates 24 are preferably arranged upon the spokes 27 of the two feeding wheels. Disposed directly in front of each of the feeding wheels and conforming with portions of the contours thereof are conducting tubes 28 designed to direct seeds from the feeding wheels to points in rear of the furrow opener 5. These tubes are supported in any preferred manner from the frame A.

By referring particularly to Fig. 4 it will be noted that a small receiving compartment 29 is formed above each valve 17 and below each guard plate 16. These compartments are adapted to receive seeds from the hopper 13 and the plates 16 prevent the seeds from packing the openings 18 and preventing the proper operation of the machine. When the valves 17 are in their normal positions the openings 18 are partly or entirely closed by the feeding wheels so as to prevent seed from escaping. Obviously when the tripping plates 24 are secured with their ends retracted from the grooves 21 the feeding wheels can rotate without causing any of the seeds to be dropped. By adjusting the tripping plates radially into the grooves 21, however, they will be caused to successively contact with the beveled portions 19 of the valves and lift said valves into the compartments 29. The openings 18 will thus be sufficiently exposed to permit seeds to drop therefrom into the grooves 21 and thence into the tubes 28. The amount of seed discharged through each opening 18 every time the valve is raised depends upon the length of the projecting portions of the tripping plates. The dropping of the seeds can therefore be regulated in an efficient and convenient manner and by projecting only certain of the plates into the grooves 21 the seeds can be dropped at desired intervals.

Instead of connecting the valves to the neck 14 by means of hinges 28', as shown in Figs. 4 and 7, trunnions 30 may be extended from the valves as shown in Fig. 8. Also, if preferred, instead of forming each block of a solid block it may be made of a metal strip bent into proper shape as shown in Fig. 9.

Although, in the drawings, the machine has been shown provided with a single hopper having two valves and feeding wheels for discharging seeds into tubes directed to a single outlet, it is to be understood that this construction may be modified without materially departing from the invention. For example, a separate hopper may be provided for each valve so that seed and fertilizer can be simultaneously dropped into a row. If preferred two separate conducting tubes having independent outlets can be extended from the feeding wheels so that two parallel rows of seeds may be planted simultaneously. Also, if preferred, the planter may be provided with a single valve and feeding wheel instead of two valves and wheels as disclosed in the drawings. These modifications are so obvious that it is not deemed necessary to show or describe them in detail.

It will be seen that the dropping mechanism embodied in the present invention is very simple and can not readily get out of order. The valve can be quickly and accurately regulated to drop any desired quantities of seed without the necessity of removing any of the parts of the machine. The set screws 26 occupy positions where they can be conveniently reached at all times for the purpose of adjusting the tripping plates. While the valve shown in Fig. 9 can be used for dropping seed, it is particularly designed for regulating the discharge of fertilizer and other material likely to clog long passages such as shown in the valves illustrated in Figs. 7 and 8.

It is of course understood that suitable handles 31 are connected to the frame A to facilitate the manipulation of the machine.

What is claimed is:

1. The combination with a receptacle having an outlet; of an apertured valve within the outlet, a rotatable element normally supporting the valve and closing the aperture, and means for lifting the valve from the rotatable element at predetermined intervals.

2. The combination with a receptacle having an outlet; of an apertured valve within the outlet, a rotatable element movable beneath and normally supporting the valve and closing the aperture, and means movable with said element for lifting the valve therefrom at predetermined intervals.

3. The combination with a receptacle having an outlet; of an apertured valve within the outlet, a feeding wheel rotatably mounted thereunder and having a peripheral groove constituting a seat for the valve, and means for lifting the valve from its seat at predetermined intervals.

4. The combination with a receptacle having an outlet; of an apertured valve within the outlet, a feeding wheel rotatably mounted thereunder and having a peripheral groove constituting a seat for the valve, and means adjustably connected to the wheel for lifting the valve from its seat at predetermined intervals.

5. The combination with a receptacle having an outlet, and a valve within the outlet; of a rotatable element below and normally supporting the valve, and means rotatable with said element for raising the valve at predetermined intervals.

6. The combination with a receptacle having an outlet, and a valve within the outlet; of a feeding wheel having a peripheral groove constituting a seat for the valve, and means adjustably connected to the wheel for actuating the valve at predetermined intervals.

7. The combination with a receptacle having an outlet, and a valve within the outlet; of a feeding wheel having a peripheral groove constituting a seat for the valve, and a tripping plate adjustably mounted within the groove to actuate the valve.

8. The combination with a receptacle having an outlet, and a valve within the outlet; of a feeding wheel having a peripheral groove constituting a seat for the valve, a radially movable tripping plate upon the wheel and within the groove, and means for locking the plate against movement.

9. The combination with a receptacle having an outlet, a valve within the outlet, and a conducting tube; of a rotatable element interposed between the valve and tube and constituting a seat for the valve, and means movable with said element for successively actuating the valve and directing material into the tube.

10. The combination with a receptacle having an outlet, a valve within the outlet, and a conducting tube; of a feeding wheel rotatably mounted between the valve and tube and having a peripheral groove constituting a seat for the valve, and means adjustably connected to the wheel and projecting into the groove for actuating the valve and directing material into the tube.

11. The combination with a receptacle having an outlet, and a guard within the outlet; of an apertured valve movably mounted below the guard, and rotatable means for simultaneously lifting the valve and opening the aperture.

12. The combination with a receptacle having an outlet, and a guard within the outlet; of a spring pressed apertured valve below the guard, and a rotatable element for actuating the valve to open the aperture at predetermined intervals.

13. The combination with a receptacle having an outlet, and a guard within the outlet; of a spring pressed apertured valve below the guard, said valve having a beveled portion, and rotatable means for contacting with the beveled portion to raise the valve and open the aperture.

14. The combination with a receptacle having an outlet, and a guard within the outlet; of a valve below the guard and having a beveled portion, and adjustable rotatable means for contacting with the beveled portion to shift and open the valve.

15. In a planter the combination with a portable frame, a drive wheel, and a furrow opener; of a receptacle having an outlet, a valve within the outlet, a feeding wheel having a peripheral groove constituting a seat for the valve, means for transmitting motion from the drive wheel to the feeding wheel, and means movable with the feeding wheel for actuating the valve at predetermined intervals.

16. In a planter the combination with a portable frame, a drive wheel, and a furrow opener; of a receptacle having an outlet, an apertured valve within the outlet, a feeding wheel having a peripheral groove constituting a seat for the valve and normally closing the aperture, means for transmitting motion from the drive wheel to the feeding wheel, and means adjustably connected to the feeding wheel for actuating the valve to open the aperture at predetermined intervals.

In testimony that I claim the foregoing as my own, I have hereto affixed my signature in the presence of two witnesses.

WILLIAM NICOLAS JAY.

Witnesses:
C. J. ELLIOTT,
J. W. DEAN.